United States Patent [19]

Byrne

[11] Patent Number: 5,537,606
[45] Date of Patent: Jul. 16, 1996

[54] SCALAR PIPELINE REPLICATION FOR PARALLEL VECTOR ELEMENT PROCESSING

[75] Inventor: Charles M. Byrne, Raleigh, N.C.

[73] Assignee: International Business Machines Corporation, Armonk, N.Y.

[21] Appl. No.: 381,463

[22] Filed: Jan. 31, 1995

[51] Int. Cl.6 .................................................. G06F 9/38
[52] U.S. Cl. ........................ 395/800; 395/375; 395/496; 364/DIG. 1; 364/DIG. 2
[58] Field of Search .................................. 395/800, 375, 395/479, 183.01, 480, 700, 183.15, 495, 403, 412, 496; 364/DIG. 1, DIG. 2

[56] References Cited

U.S. PATENT DOCUMENTS

| | | | |
|---|---|---|---|
| 4,745,547 | 5/1988 | Buchholz et al. | 395/800 |
| 4,791,555 | 12/1988 | Garcia et al. | 395/800 |
| 5,168,573 | 12/1992 | Fossoum et al. | 395/800 |
| 5,187,796 | 2/1993 | Wang et al. | 395/800 |
| 5,261,113 | 11/1993 | Jouppi | 395/800 |
| 5,437,043 | 7/1995 | Fujii et al. | 395/800 |

*Primary Examiner*—Daniel H. Pan
*Attorney, Agent, or Firm*—Bernard M. Goldman

[57] ABSTRACT

A central processor (which may be entirely contained in a single semiconductor chip), that performs vector operations using scalar machine resources. The processor incorporates multiple parallel scalar execution unit pipelines, which do not contain hardware dedicated to vector instructions, vector registers, or vector execution controls. The processor uses scalar instructions to perform vector operations if a vector mode is indicated in the processor controls.

6 Claims, 8 Drawing Sheets

|  |  |  |  |
|---|---|---|---|
|  | LCTR | r0 | LOAD COUNT |
| LOOP | LFD | fp0,8(r6) | LOAD A(i) |
|  | LFD | fp1,8(r7) | LOAD B(i) |
|  | FADD | fp0,fp0,fp1 | ADD |
|  | LFD | fp1,16(r6) |  |
|  | STFD | fp0,8(r8) | STORE INTO C(i) |
|  | LFD | fp0,16(r7) |  |
|  | FADD | fp0,fp1,fp0 |  |
|  | LFD | fp1,24(r6) |  |
|  | STFD | fp0,16(r8) |  |
|  | LFD | fp0,24(r7) |  |
|  | FADD | fp0,fp1,fp0 |  |
|  | LFDU | fp1,32(r6) | LOAD A(i+3) |
|  | STFD | fp0,24(r8) |  |
|  | LFDU | fp0,32(r7) | LOAD B(i+3) |
|  | FADD | fp0,fp1,fp0 | ADD |
|  | STFDU | fp0,32(r8) | STORE INTO C(i+3) |
|  | BCT | LOOP | BRANCH IF COUNT NOT 0 |

FIG.5A

| | | | |
|---|---|---|---|
| 501 | | LVL | r0 | LOAD VECTOR LENGTH |
| 502 | | CVO | r6,8(r6) | COMPUTE VECTOR OFFSETS FOR r6 |
| 503 | | CVO | r7,8(r7) | COMPUTE VECTOR OFFSETS FOR r7 |
| 504 | | CVO | r8,8(r8) | COMPUTE VECTOR OFFSETS FOR r8 |
| 511 | LOOP | LFD | fp0,8(r6) | LOAD A(i) AND A(i+1) |
| 512 | | LFD | fp1,8(r7) | LOAD B(i) AND B(i+1) |
| 513 | | FADD | fp0,fp0,fp1 | ADD |
| 521 | | LFD | fp1,16(r6) | |
| 514 | | STFD | fp0,8(r8) | STORE INTO C(i) AND C(i+1) |
| 522 | | LFD | fp0,16(r7) | |
| 523 | | FADD | fp0,fp1,fp0 | |
| 531 | | LFD | fp1,24(r6) | |
| 524 | | STFD | fp0,16(r8) | |
| 532 | | LFD | fp0,24(r7) | |
| 533 | | FADD | fp0,fp1,fp0 | |
| 541 | | LFDU | fp1,32(r6) | LOAD A(i+6) AND A(i+7) |
| 534 | | STFD | fp0,24(r8) | |
| 542 | | LFDU | fp0,32(r7) | LOAD B(i+6) AND A(i+7) |
| 543 | | FADD | fp0,fp1,fp0 | ADD |
| 544 | | STFDU | fp0,32(r8) | STORE INTO C(i+6) AND C(i+7) |
| 550 | | BV | LOOP | BRANCH IF VECTOR LENGTH NOT 0 |

| STAGE | VL | VCT | r6 | r6' | r7 | r7' | r8 | r8' |
|---|---|---|---|---|---|---|---|---|
| START | 0 | 0 | | | | | | |
| LVL r0 | 5 | 2 | SAA−8 | SAA−8 | SAB−8 | SAB−8 | SAC−8 | SAC−8 |
| CVO r6,8(r6) | 5 | 2 | " | " | " | " | " | " |
| CVO r7,8(r7) | 5 | 2 | SAA−16 | SAA−8 | SAB−16 | SAB−8 | " | " |
| CVO r8,8(r8) | 5 | 2 | " | " | " | " | SAC−16 | SAC−8 |
| ITERATION 1 | 3 | 2 | SAA+48 | SAA+56 | SAB+48 | SAB+56 | SAC+48 | SAC+56 |
| ITERATION 2 | 1 | 1 | SAA+112 | SAA+120 | SAB+112 | SAB+120 | SAC+112 | SAC+120 |
| ITERATION 3 | 0 | 0 | SAA+176 | SAA+120 | SAB+176 | SAB+120 | SAC+176 | SAC+120 |

*FIG.7*

SCALAR PIPELINE REPLICATION FOR PARALLEL VECTOR ELEMENT PROCESSING

INTRODUCTION

This invention relates to data processing systems and, more particularly, to data processing systems that include apparatus for scalar operations, where such apparatus is replicated for parallel vector element operations.

BACKGROUND OF THE INVENTION

The concept of vector processing has been incorporated into computing systems to increase performance for application programs that can be expressed in terms of operations on vector operands. Vector processing systems include special purpose vector instructions for performing consecutive sequences of operations using pipelined execution units. Since multiple operations are implied by a single vector instruction, vector processing systems require fewer instructions to be fetched and decoded by the hardware. Vector processing reduces the frequency of branch instructions since the vector instructions themselves specify repetition of processing operations on different data elements. Utilization of pipelined execution units is maximized since the same operation is repeated on multiple data elements—once enough vector elements have entered the pipeline to fill all its stages, one result is produced each machine cycle. Multiple parallel execution pipelines can be implemented within the vector processing paradigm to process logically adjacent vector elements concurrently.

A certain amount of overhead is normally associated with vector processing. There is overhead to fill the data and execution pipelines, as well as overhead for additional instructions that are needed to setup and control the vector pipeline, such as those for breaking large vector operands into sections that will fit in smaller vector registers. To compensate, prior art vector computers use large registers so that the vector startup overheads are amortized over a large number of pipelined operations. These large registers consume valuable chip space and add significant product cost as registers are implemented in expensive high-speed technologies. Large vector registers can require saving and restoring thousands of bytes when processing interruptions, imposing additional processing overhead.

An aspect of prior art vector processors is their ability to supply vector elements from memory in a pipelined fashion in order to keep the vector execution pipeline full. In architectures with large vector sections, this behavior is a natural fallout of the size of the vector registers. Entire sections worth of data can be prefetched without the need to guess address reference patterns. The vector architecture guarantees these operands will be used. There is overhead associated with these prefetched operands that occurs at section boundaries, where the full memory access latency is incurred before the first element is returned. This overhead is incurred for each vector section that must be fetched from memory.

A representative vector processing configuration is disclosed in U.S. Pat. No. 4,791,555 issued Dec. 13, 1988 to Garcia et al and entitled "Vector Processing Unit". In this invention, a separate vector processing functional unit is connected to a general purpose data processing system. The base system provides instruction handling, operand fetch and store capability, and exception handling for the vector unit. This configuration incorporates a dedicated vector register set and separate vector instruction set for operating on vector data. The vector functional unit includes an arithmetic pipeline for operating on vector elements that duplicates the capabilities of the scalar pipeline in the base general purpose system. The present invention utilizes the base scalar instruction set, scalar registers, and scalar execution apparatus for parallel vector element processing.

U.S. Pat. No. 4,745,547 issued May 17, 1988 to Buchholz et al and entitled "Vector Processing discloses a technique for processing vector operands in storage that are too large to fit in the vector registers. Vector operations are broken up in sectioning loops, where vector operands are processed in sections that will fit in the vector registers. This technique provides for interruptions between any pair of vector element operations, and exact recovery at the point of interruption. The technique requires an additional instruction within the inner vector processing loop, which imposes a performance overhead. Vector instructions accessing operands in storage automatically update vector operand address registers to step to the next vector section in storage. However, when the same operand occurs more than once in a vector loop, it is necessary to reload the original operand address for each subsequent use of the operand, and incur a performance overhead, or to represent the same operand address in multiple addressing registers, thereby consuming more of the limited register resource available to the compiler. The full vector length is contained in a general purpose register, rather than a dedicated length register. As a consequence, the data fetch and store pipelines must be restarted for each iteration of the loop.

This invention incorporates large vector registers to cover the vector startup overheads. Since vector instructions specify a large number of operations, interruptability of vector instructions and exception handling at the elemental level are necessities.

Vector architectures commonly include instructions for loading and storing vectors that are not arranged according to a fixed stride in storage. Gather and scatter operations and other methods for handling sparse matrices are examples. Instructions such as these are necessary in architectures with large, dedicated vector registers to support the various types of programming constructs that arise in vector programs. Their inclusion is mandated by the separation of vector and scalar data in different register sets. In prior art vector architectures, data in vector registers are not easily accessible to scalar instructions. It may be necessary to store a large vector register to memory so that a scalar instruction can access a single element or to process the vector data using a scalar algorithm that is more economical than an equivalent vector instruction.

Superscalar techniques have been used to enable RISC computers to achieve performance equivalent to single-pipeline vector processors, without the additional hardware complexity and cost of dedicated vector registers, instruction sets and execution facilities.

Superscalar computers have multiple independent execution pipelines that can execute different scalar instructions concurrently. A limitation of these systems is the additional hardware required to fetch and decode multiple instructions simultaneously, and to enforce interlocks between in-progress instructions that contain data dependencies as more and more parallel instruction execution is attempted. The present invention incorporates vector techniques into the scalar processing architecture to obtain higher levels of parallel operation. The instruction fetch, decode, and element independence advantages of vector operations is obtained without using dedicated vector instruction sets, vector register sets or dedicated vector execution facilities.

U.S. Pat. No. 5,261,113 issued Nov. 9, 1993 to Jouppi and entitled "Apparatus and Method for Single Operand Register Array for Vector and Scalar Data Processing Operations" discloses a technique for using a shared register file to store vector operands as well as scalar operands. Data in the register file is directly accessible for both vector operations and scalar operations. The shared register file is fixed in size by the fields used to address the file, thereby limiting the size of vector operands that can be addressed. Multiple operations are pipelined through a single pipelined execution unit to achieve one result per cycle under control of a single vector instruction. A new instruction format is defined to cover the range of vector arithmetic operations, but memory load and store operations are performed with scalar instructions in a base general purpose processing system. The new instruction format supporting vector operations includes fields to identify each operand as vector or scalar, and to specify the vector length. This invention identifies a single pipeline configuration and does not facilitate multiple pipeline configurations. The use of arbitrary sequences of scalar registers to form vector registers complicates the dependency interlock logic in a multiple pipeline configuration. The lack of vector load and store instructions requires that parallel loads and stores be done using superscalar techniques.

SUMMARY OF THE INVENTION

Accordingly, it is an object of the present invention to modify a general purpose data processing system to include a capability of performing vector operations in addition to scalar operations.

It is a feature of the invention to define a vector mode of operation for a scalar instruction set executed by the system (including scalar storage access instructions) which can then be reinterpreted by the system hardware under program control to perform vector operations, without changes to the existing scalar instruction formats.

It is another feature of this invention to combine scalar registers in different execution units of the same CPU to contain different elements of a vector involved in execution, so that the combination of registers operate as am effective vector register.

It is still another feature of the present invention to interpret operations on scalar registers to imply repetition of a specified vector operation using a scalar register in one execution unit and an extension scalar register in another execution unit when the vector mode is in effect.

It is another feature of the present invention to interpret displacement or index register values used in effective memory address calculations to imply additional increments of the specified displacement or index register value when vector mode is in effect.

It is an additional feature of the invention to perform multiple concurrent vector element operations using the scalar processing apparatus and one or more copies of such apparatus executing in parallel.

It is yet another feature of the invention to process vector operands of arbitrary length, which may be smaller or larger than the size of the effective vector register, without imposing additional processing overhead for breaking the vector operands into sections.

It is still another feature of the invention that programs comprising scalar instructions execute correctly without modification on hardware configurations having larger or smaller effective vector registers.

In the invention, the number of registers usable in each vector operation scales with the number of execution units available in a CPU for being combined for a vector execution. The bandwidth requirements for each register remain fixed. The registers can be physically located adjacent to the execution units with which they are associated, removing the need for wiring paths to and from their register files to enable sharing of registers among execution units. Thus, scalar registers participate as elements of vector registers.

The need for physically renamable registers is reduced as compared to prior superscalar implementations having the same number of execution units.

In CPUs having plural pipelined execution units having respective register files, the number of elements in the vector registers is equal to the number of pipelines on the machine, unlike traditional vector architectures where large vector registers are implemented to cover vector processing overheads.

Another advantage of this invention is that it permits an existing scalar instruction set to be used to program both scalar and vector operations. A new register is defined whose value indicates the length of vector operands of arbitrary size in storage. A non-zero value in this register indicates that scalar instructions are to be interpreted to specify repetition of the specified operation using the additional pipeline(s) and registers. A method is defined for initiating vector operation by setting the value of the new register, and for processing vectors of arbitrary size by updates to the register within a processing loop. Suitable vector interpretations are defined for the existing scalar instruction repertoire.

Thus, the invention allows for use of an existing set of scalar registers for both scalar and vector operations, with very little modification of the hardware in a CPU. This allows use of existing register resource to be increased by allowing multiple sets of scalar registers to operate in parallel at the same time on vector data. Any register is then available for either scalar, vector or mixed scalar/vector use without the additional overhead that is found in a traditional vector architectures which move data between vector and scalar registers.

This invention enables an optional vector mode of operation for a CPU having a plurality of separate execution units containing respective sets of scalar registers. In the vector mode, corresponding scalar registers in different execution units are combined into a vector section which executes a section of a vector in a single CPU operation. The CPU retains its conventional ability to operate in scalar mode, in which the scalar registers in its plural execution units operate in there normal manner.

These and other objects, features, and advantages of the invention are attained in the preferred embodiment, by providing multiple scalar execution pipelines with scalar register files in a CPU that includes storage, and at least one functional unit capable of executing scalar instructions.

DESCRIPTION OF THE PREFERRED EMBODIMENT

Figure 1:
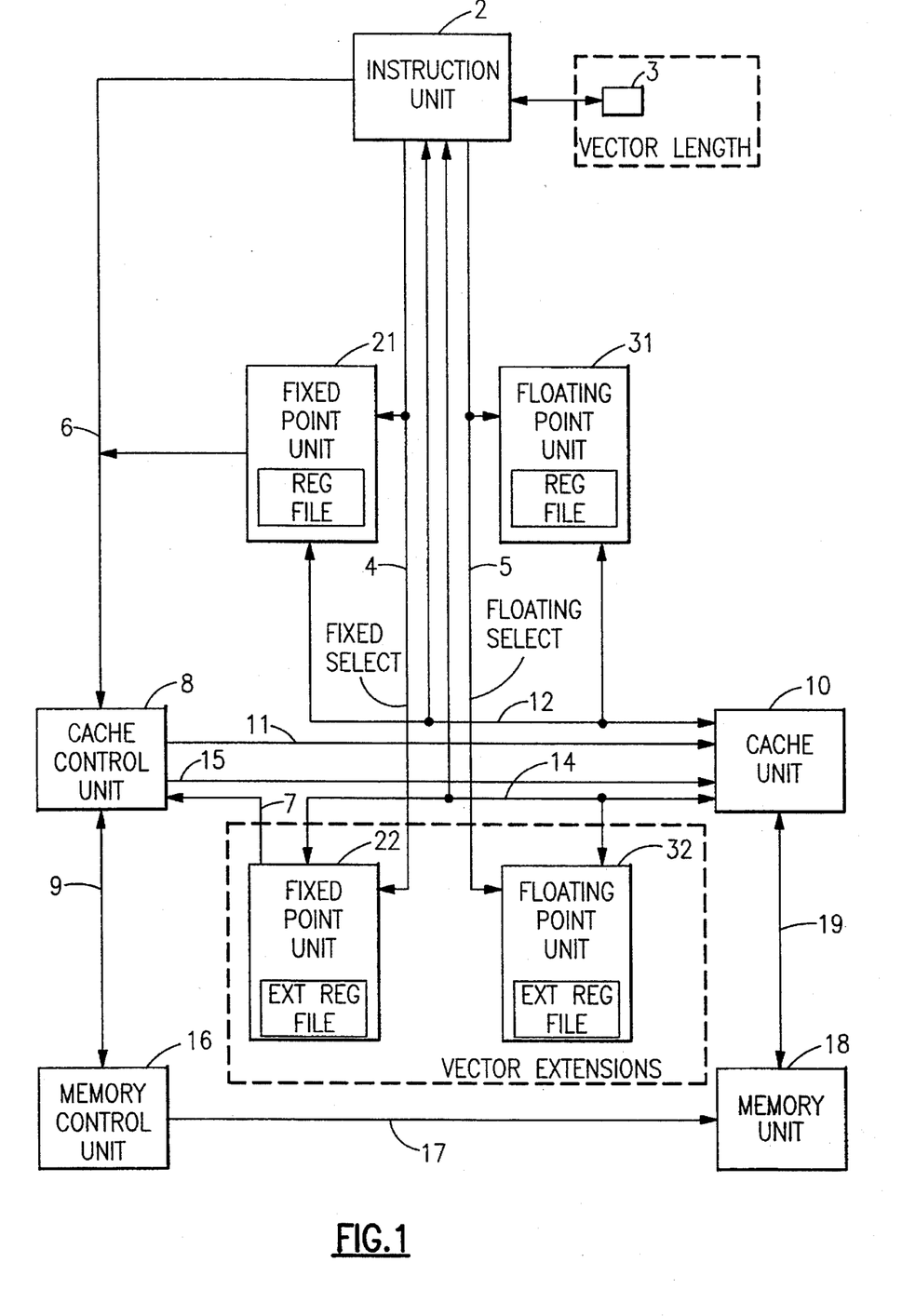
FIG. 1 is a block diagram representation of a superscalar processor incorporating additional fixed point and floating point execution units according to the present invention.

Referring to FIG. 1, a central processing unit with parallel fixed point execution units 21 and 22, and parallel floating point execution units 31 and 32 is shown. Excluding fixed point unit 22 and floating point unit 32, the figure represents a typical superscalar central processing unit having the capability to execute multiple scalar instructions simultaneously using different execution units. The preferred embodiment supports only the register-to-register form of arithmetic operation common to RISC scalar computers, because of the lower memory bandwidth demands. Memory-to-register and memory-to-memory embodiments are also possible within the scope of this invention. Instruction unit 2 initiates instruction fetch requests by applying address and control signals to data cache control unit 8 using shared address bus 6. Data signals representing requested instructions are received from cache unit 10 along shared data buses 12 and 14. The instruction unit 2 includes an instruction cache and controls as well as instruction buffers for buffering prefetched instructions. Instruction unit 2 initially decodes all instructions, executes all branch instructions, dispatches other instructions to the fixed and/or floating point units, accordingly, for execution, and synchronizes all units by synchronization mechanism not shown. Vector length register 3 is controlled by instruction unit 2. The central processing unit of FIG. 1 includes one vector extension to each of the scalar fixed and floating point execution units. Instructions that operate on integer data are simultaneously dispatched to fixed point units 21 and 22 using shared instruction signal bus 4. Instructions that operate on floating point data are simultaneously sent to floating point units 31 and 32 using shared instruction signal bus 5. Fixed point units 21 and 22 participate in the execution of floating point load and store operations.

Accordingly, floating point load and store instructions are transmitted to fixed point units 21 and 22 and floating point units 31 and 32. Fixed point unit 21 and floating point unit 31, herein referred to as pipeline 1 execution units, perform all scalar mode operations as well as the first element operations for all vector operations. Fixed point unit 22 and floating point unit 32, herein referred to as pipeline 2 execution units, perform the second element operations for all vector operations.

Pipelined fixed point execution units 21 and 22 are identical in design and simultaneously receive identical instruction signals from instruction unit 2 along instruction signal bus 4. The architected scalar integer register set is represented by a register file contained within fixed point unit 21. Fixed point unit 22 represents a single vector execution pipeline extension for integer vector operations. The register file contained within fixed point unit 22 represents the architected integer vector extensions to the scalar integer registers represented in fixed point unit 21. Addresses for two logically adjacent integer vector elements are simultaneously transmitted to cache control unit 8 along address buses 6 and 7.

Addresses representing the first element in each integer vector element pair are transmitted to cache control unit 8 by fixed point unit 21 via address signal bus 6. Data is exchanged between fixed point unit 21 and cache unit 10 on data signal bus 12. Addresses for the second element of each integer vector section are transmitted to cache control unit 8 by fixed point unit 22 using address bus 7. Data is exchanged between fixed point unit 22 and cache unit 10 on data signal bus 14. Storage operations occur simultaneously for the two vector elements comprising each integer vector section.

Pipelined floating point execution units 31 and 32 are identical in design and simultaneously receive identical instruction signals from instruction unit 2 along instruction signal bus 5. The architected scalar floating point register set is represented by a register file contained within floating point unit 31. Floating point unit 32 represents a single vector execution pipeline extension for floating point vector operations. The register file contained within floating point unit 32 represents the architected floating point vector extensions to the scalar floating point registers represented in floating point unit 31. Floating point load and store instructions are sent to fixed point units 21 and 22, using instruction signal bus 4, as well as to floating point units 31 and 32, using instruction signal bus 5. Fixed point units 21 and 22 perform effective address calculations for floating point load and store operations on behalf of floating point units 31 and 32, respectively, and initiate corresponding data cache read and write operations. Addresses for two logically adjacent floating point vector elements are transmitted to cache control unit 8 along address buses 6 and 7. Addresses representing the first element in each floating point vector element pair are transmitted to cache control unit 8 by fixed point unit 21 via address signal bus 6. Data signals are exchanged between floating point unit 31 and cache unit 10 on data signal bus 12. Addresses for the second element of each floating point vector section are transmitted to cache control unit 8 by fixed point unit 22 using address bus 7. Data signals are exchanged between floating point unit 32 and cache unit 10 on data signal bus 14. Storage operations occur simultaneously for the two vector elements comprising each floating point vector section.

Cache control unit 8 receives instruction fetch addresses from instruction unit 2 along address signal bus 6, and data fetch and store addresses from fixed point units 21 and 22 along address signal buses 6 and 7, respectively. Addresses for cache read and write operations are transmitted by cache control unit 8 to dual-ported cache unit 10 along address signal buses 11 and 15. Address signal bus 11 conveys data cache read and write addresses from cache control unit 8 to processor cache unit 10 for pipeline 1 storage operations and instruction fetches. Address signal bus 15 conveys data cache read and write addresses from cache control unit 8 to processor cache unit 10 for pipeline 2 storage operations. Cache control unit 8 sends address and control signals to memory control unit 16 using address signal bus 9. Memory control unit 16 sends memory read and write addresses to memory unit 18 along address signal bus 17. Memory unit 18 receives address signals from memory control unit 16 on address signal bus 17, and transfers data to and from cache unit 10 on bi-directional data signal bus 19.

Dual-ported cache unit 10 receives address signals from cache control unit 8 on address signal buses 11 and 15. Addresses for pipeline 1 storage operations are received on address signal bus 11. Data for said storage operations are conveyed along bi-directional data bus 12 on behalf of fixed point unit 21 and floating point unit 31.

Addresses for pipeline 2 storage operations are received on address signal bus 15. Data for said storage operations are conveyed along bi-directional data bus 14 on behalf of fixed point unit 22 and floating point unit 32. Addresses for instruction fetch operations are received on address signal bus 11. Data for said instruction fetch operations are returned along bi-directional data buses 12 and 14 to instruction unit 2.

In the preferred embodiment, address signal buses 6, 7, 9, 11, 15 and 17 can convey 32 bit addresses. Instruction signal buses 4 and 5 can convey 32 bit instruction signals. Data signal buses 12 and 14 can convey 32 bit or 64 bit data signals. Data signal bus 19 can convey 128 bit data signals.

Figure 2:
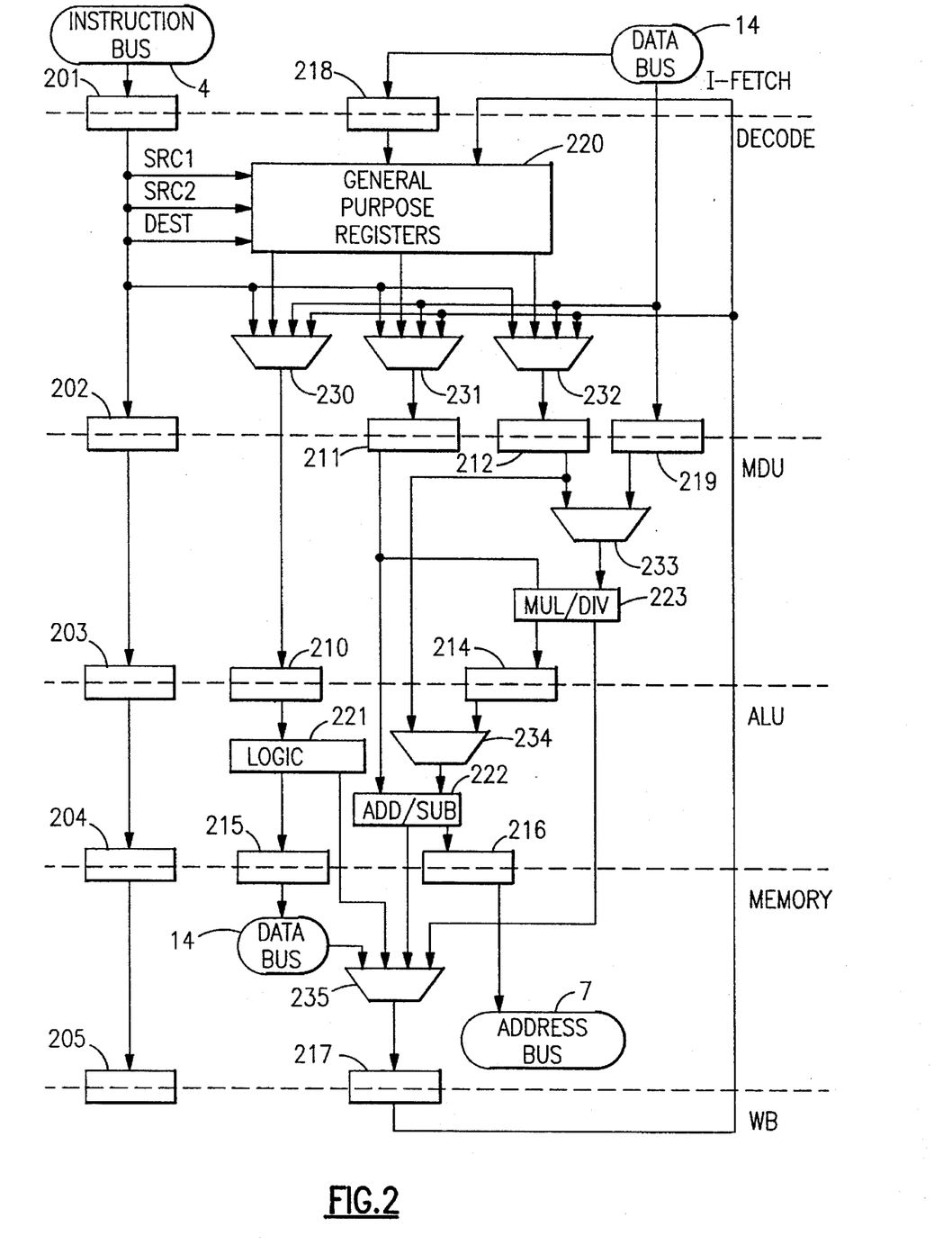
FIG. 2 is a block diagram representation of the hardware paths, functional units, and registers of the fixed point execution units shown in FIG. 1.

Referring to FIG. 2, a block diagram of the pipeline for fixed point execution unit 22 is shown. The pipeline is divided into instruction fetch, decode, multiply/divide unit, arithmetic logic unit, memory, and write back stages. Instruction signals are transmitted from instruction unit 2 to instruction register 201 on instruction signal bus 4 during the instruction fetch stage. Instruction register 201 controls the operation of the decode stage, and applies signals to register file 220, to multiplexer units 230, 231, and 232, and to instruction register 202. Instruction register 202 controls the operation of the multiply stage, and applies signals to instruction register 203.

Instruction register 203 controls the arithmetic logic unit stage and applies signals to instruction register 204.

Instruction register 204 controls the memory stage and applies signals to instruction register 205. Instruction register 205 controls the write back stage.

One or more pipeline stages may be skipped, depending on the particular instruction being executed. Vector storage operations under stride proceed through both the multiply stage, where the byte stride is multiplied by the pipeline bandwidth (section size), to obtain the element offset, and the arithmetic logic stage, where the element offset is added to the value in the base register to obtain the effective element address. Scalar storage operations and vector stride 0 storage operations do not require the multiply stage. Scalar and vector arithmetic operations proceed through either of the multiply/divide or arithmetic logic stages, but not the memory stage.

Register file 220 has two write ports and three read ports, supporting two writes and three reads per processor cycle. Register file 220 receives signals from instruction register 201 and from latch register 217 and latch register 218, and applies signals to multiplexer units 230, 231 and 232. Multiplexer units 230, 231 and 232 each receive signals from register file 220, instruction register 201, latch register 217 and data bus 14. Multiplexer unit 230 applies signals to latch register 210. Multiplexer unit 231 applies signals to latch register 211. Multiplexer unit 232 applies signals to latch register 212.

Register 219 is a configuration register containing the section size, or number of pipelines available for vector operations, for use in vector operand addressing. Multiplexer unit 233 receives signals from latch register 212, from section size register 219, and applies signals to multiply/divide unit 223. Multiply/Divide unit 223 receives signals from latch register 211 and multiplexer unit 233 and applies signals to latch register 214 and to multiplexer unit 235.

Multiplexer unit 234 receives signals from latch register 212 and latch register 214 and applies signals to add/subtract unit 222.

Logic unit 221 receives signals from latch register 210 and applies signals to latch register 215 and to multiplexer unit 235.

Add/subtract unit 222 receives signals from latch register 211 and multiplexer unit 234 and applies signals to address latch register 216 and to multiplexer unit 235.

During the memory stage, data signals from latch register 215 are applied to data bus 14, and address signals are applied to address bus 7 from address latch register 216. Multiplexer unit 235 receives signals from data bus 14, logic unit 221, add/subtract unit 222 and multiply/divide unit 223, and applies signals to latch register 217. During the write back stage signals are applied from latch register 217 to multiplexors 230, 231 and 232, and to register file 220.

Figure 3:
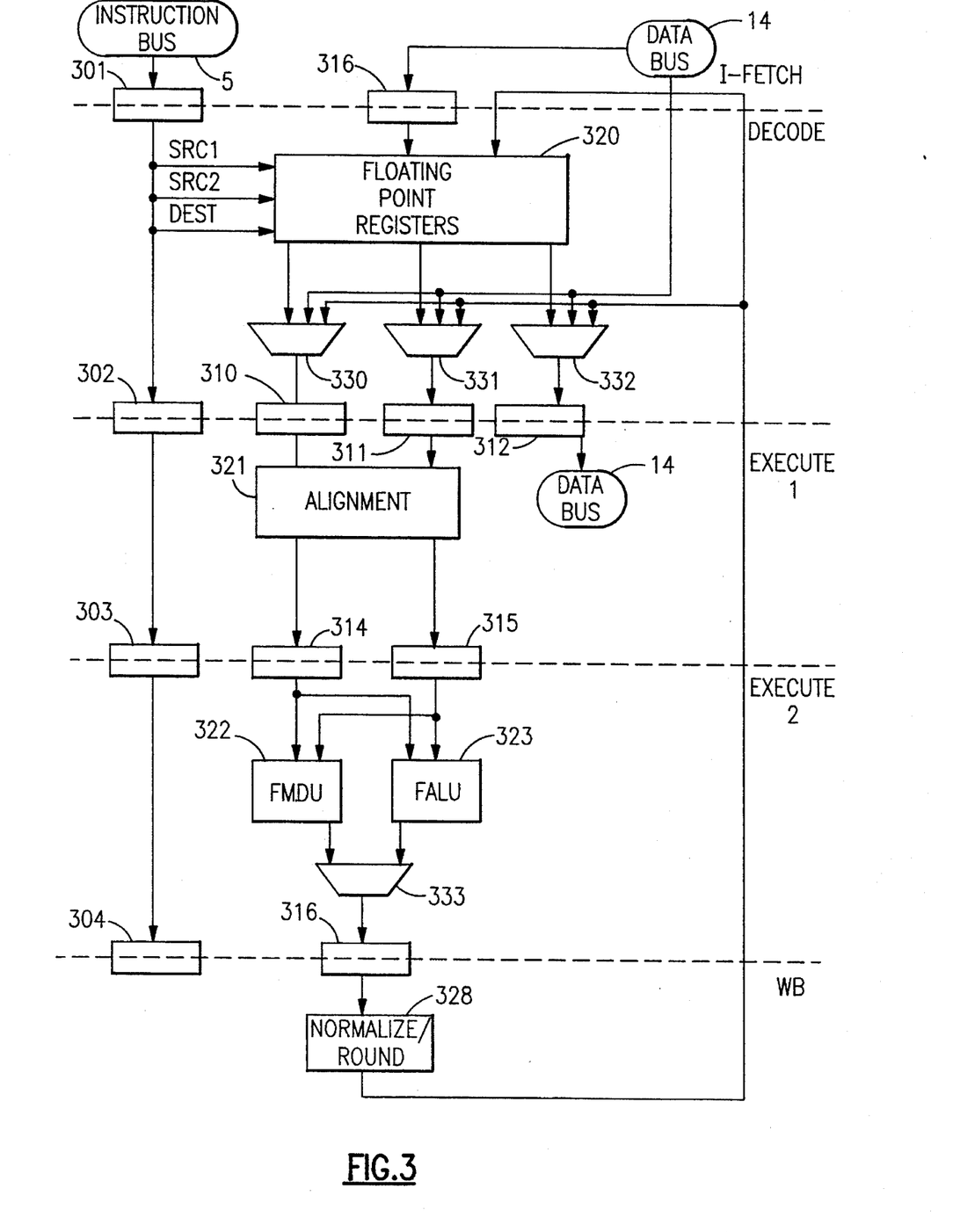
FIG. 3 is a block diagram representation of the r0 hardware paths, functional units, and registers of the floating point execution units shown in FIG. 1.

Referring next to FIG. 3, a block diagram of the pipeline for floating point execution unit 32 is shown. The pipeline is divided into instruction fetch, decode, execute1, execute2, and write back stages.

During the instruction fetch stage, instruction signals are transmitted to instruction register 301 by instruction unit 2 on instruction signal bus 5. Instruction register 301 controls the decode stage, and applies signals to register file 320 and to instruction register 302. Instruction register 302 controls the execute1 stage and applies signals to instruction register 303.

Instruction register 303 controls the execute2 stage and applies signals to instruction register 304. Instruction register 304 controls the write back stage.

Register file 320 has two write ports and three read ports, supporting two writes and three reads per processor cycle. Register file 320 receives signals from instruction register 301, from latch register 316, and from normalize/round unit 328, and applies signals to multiplexors 330, 331, and 332. Multiplexors 330, 331, and 332 each receive signals from data signal bus 14, from register file 320, and from normalize/round unit 328. Multiplexer unit 330 applies signals to latch register 310.

Multiplexer unit 331 applies signals to latch register 311. Multiplexer unit 332 applies signals to latch register is a unique pointer table 312. Alignment unit 321 aligns operands received from latch registers 310 and 311, and transmits the results to latch registers 314 and 315.

Floating point multiply/divide unit 322 receives signals from latch register 314 and 315, and transmits signals to multiplexer unit 333.

Floating point arithmetic logic unit 323 receives signals from latch registers 314 and 315, and transmits signals to multiplexer unit 333.

Multiplexer unit 333 receives signals from floating point multiply/divide unit 322 and floating point arithmetic logic unit 323 and transmits signals to latch register 316. The normalize/round unit 328 receives signals from latch register 316 and transmits signals to multiplexors 330, 331, and 332, and to register file 320.

Figure 4:
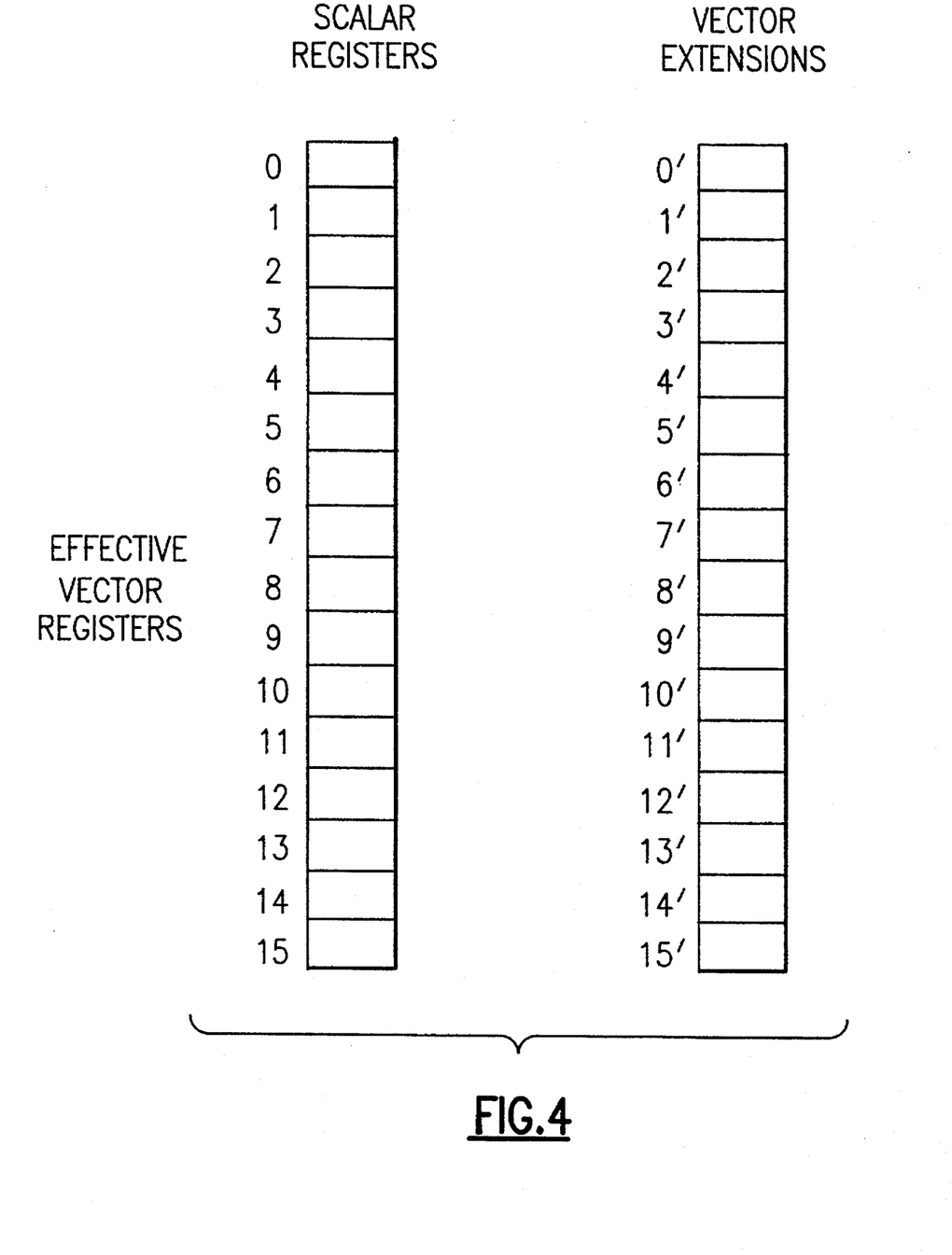
FIG. 4 is a block diagram representation of a set of scalar registers and their relationship to a corresponding set of vector extension registers.

FIG. 4 shows the logical relationship between the architected scalar registers and the vector extension registers. Scalar registers are represented within the register files in the pipeline 1 execution units 21 and 31. Identical register files within execution units 22 and 32 contain the architected vector extension registers. Each scalar register has an implied vector extension in the corresponding vector extension register file.

Parallel vector element processing using the functional units described in FIGS. 1, 2 and 3 operates according to the value in the architected vector length and vector count registers. The vector length register represents the remaining length of vector operands in storage. The vector count register represents the portion of the remaining vector length that will fit in the effective vector registers. A vector length of zero specifies normal scalar operation.

During scalar operation, identical results are propagated to the same target register location in the scalar and vector extension register files. In the preferred embodiment, this is accomplished by transmitting identical values on data buses 12 and 14 for sc alar-mode loads, and performing identical processing in the pipeline 1 and pipeline 2 execution units to maintain coherence of the register files. For non-zero vector lengths, the scalar instruction set is interpreted to specify operations on vector operands. In the two-pipeline hardware configuration shown in FIG. 1, operations involving register numbers 0, 1, 2, . . . , 15 imply repetition of the operation using vector extension registers 0', 1', 2', . . . , 15'.

Storage operations are implied similarly, where the base addressing register is interpreted as the base address of a vector operand, and the index register or immediate displacement value represents the vector stride in bytes. Vector operations when the vector length is one produce results identical to scalar operations in the scalar registers, and do not affect the values in the vector extension registers.

Two-element effective vector registers are defined by the combination of the existing scalar registers and their vector extensions. Vectors in storage are processed in two-element sections under control of the architected vector length and vector count registers. The new LOAD VECTOR LENGTH instruction is added to the scalar instruction set for initiating vector operation by setting the vector length register to a non-zero value and computing the initial vector count. The new loop-terminating BRANCH ON VECTOR instruction is defined, whose function is to decrement the vector length register by the vector count, compute the vector count for the next iteration as the lesser of the section size and the vector residual, and branch to the beginning of the loop if the result is not zero. The new COMPUTE VECTOR OFFSETS instruction is defined to aid in management of vector operand addresses. The new SAVE AND RESET VECTOR LENGTH instruction saves the current vector length in a general purpose register and then resets the vector length and vector count registers to zero. Vector operation can be suspended by the use of this instruction and later resumed by coding the LOAD VECTOR LENGTH REGISTER instruction with the saved vector length as the operand. This technique can be used to disable vector mode across a subroutine call within a vector-mode loop. Finally, the GET VECTOR SECTION SIZE instruction retrieves the configuration- dependent section size to facilitate section size-independent programming.

Vector stride 0 is used to specify scalar operands during vector operation. Stride 0 vector loads specify the same source address for all vector elements. Identical values are loaded into corresponding scalar and vector extension registers. Operations between such operands in both pipelines produce identical results in corresponding scalar and vector extension registers. Mixed scalar-vector operations, such as multiplication of a vector by a scalar, are performed by specifying a register that has been the target of a stride 0 load as the scalar operand. The compiler has the flexibility to allocate as many or as few of the effective vector registers to scalar operands as needed. Coherence of the scalar operand copies in the scalar and vector extension registers is automatic because the identical result is produced in both pipelines. Scalar stores during vector operation are specified using vector stride 0. Stride 0 store operations are discarded by the pipeline 2 execution units, and executed only within the pipeline 1 units.

Vector Sectioning

Vector sectioning as defined in the S/390 vector architecture is disclosed in U.S. Pat. No. 4,745,547. Vector sectioning enables the processing of vectors of arbitrary size in memory, where such vectors may be larger or smaller than the size of the vector registers.

Vectors are processed in sections, equal in size to the number of elements in the vector registers, by sectioning loops. Any vector residual left after processing the full sections is processed by the final loop iteration using part of the vector registers.

In the sectioning technique of the present invention, the vector length is contained in the architected vector length register. The LOAD VECTOR LENGTH instruction initiates vector operation by setting the vector length register to a non-zero value and computing the initial vector count as the lesser of the vector length and the section size. The BRANCH ON VECTOR instruction at the end of the loop updates the vector length and vector count registers after each loop iteration and branches when the vector length is non-zero.

The LOAD VECTOR LENGTH instruction is used outside the inner vector loop. The vector sectioning responsibility is incorporated into the BRANCH ON VECTOR instruction that updates the vector length and vector count registers. The BRANCH ON VECTOR instruction supplants the function of a scalar-mode branch instruction. No additional instructions are added to the inner vector processing loop to perform vector sectioning.

Vector operand addressing is facilitated by the new COMPUTE VECTOR OFFSETS instruction. This instruction offsets base address copies in fixed point effective vector registers by succeeding increments of stride to establish base addresses for each pipeline. The COMPUTE VECTOR OFFSETS instruction produces an effective vector register of base addresses. The stride value is multiplied in each fixed point pipeline unit by the quantity (VCT−p) to obtain the element offset for that pipeline, where VCT is the vector count and p is the pipeline number. This offset is then subtracted from the base address value to obtain the base address for that pipeline.

Vector sectioning requires that vector operand addresses be updated each time through the loop by the product of the vector stride and the number of elements processed. Vector operand base addresses are updated without adding additional instructions to the inner vector loop by the use of update instructions, of the form defined in the POWER architecture. (The POWER architecture is explained in prior publication "POWERstation and POWERserver Hardware Technical Information General Architectures", second edition, 1992, available from the IBM Corporation under form number SA23-2643-02. Its AIX programming is described in "AIX Version 3.2 Assembler Language Reference", Third Edition, October 1993, under IBM Corporation form number SC23-2197-02.)

The element addresses initially set by the COMPUTE VECTOR OFFSETS instruction are updated by adding the product of the section size and the stride, specified in the index register or the immediate displacement value in the instruction, to the base address values in the vector register of base addresses.

The element addresses so computed represent the next elements to be accessed by each pipeline. Each element address is transmitted to the cache unit on the address bus and written back to the base register in the pipeline's register file to be used as a base for the next element addressing operation for that pipeline. The update-form instructions operating in vector mode perform the dual purpose of updating vector base addresses for the next iteration and loading or storing a section of vector data. No additional instructions are required within the inner vector processing loop for operand address maintenance. Vector operand prefetching is implemented along the full length of the vector, rather than on a section-by-section basis, by reference to the vector length register. By referencing the full length of the vector operand, the fetch pipeline does not have to be restarted at section boundaries.

Load and store instructions that are not of the update form are also supported. These instructions do not update the base register value.

When it is necessary to access a given vector operand in storage more than once within a vector loop, the non-update form of load and store instructions are used for all but the last access. Update form instructions are used for the last access to step the operand address to the next section. Vector Gather/Scatter operations can be accomplished using the index register form of non-update storage access instructions. For vector operations under stride, the index register operand is an effective fixed point vector register with all elements set to the same stride value. For gather/scatter operations, the index register elements contain arbitrary values, representing different displacements from the base register for each element. This vector of element offsets is added to the vector of base addresses to obtain a vector of element addresses for accessing a vector of randomly organized elements.

Example Using Contiguous Vectors

Figure 5A:
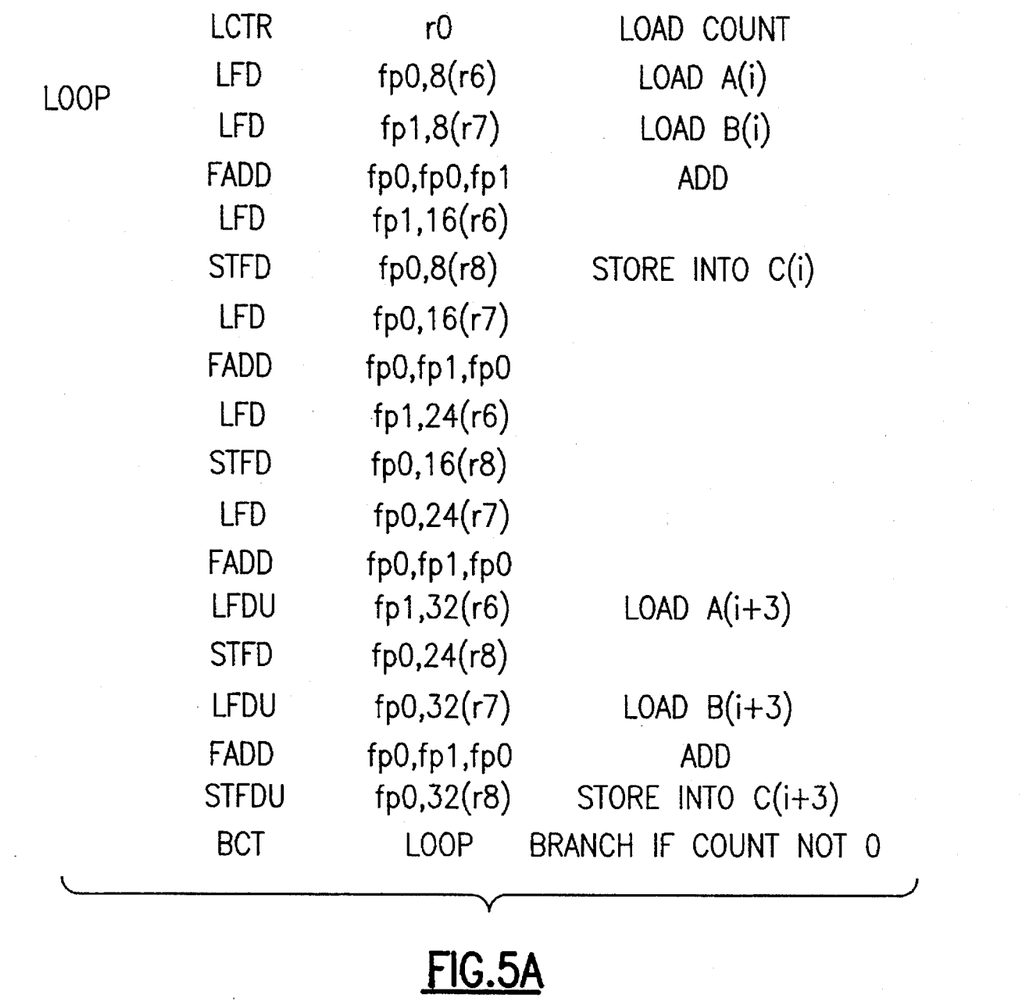
FIG. 5a shows a program segment for adding two vectors and storing the result in a third vector using POWER scalar instructions.
Figure 5B:
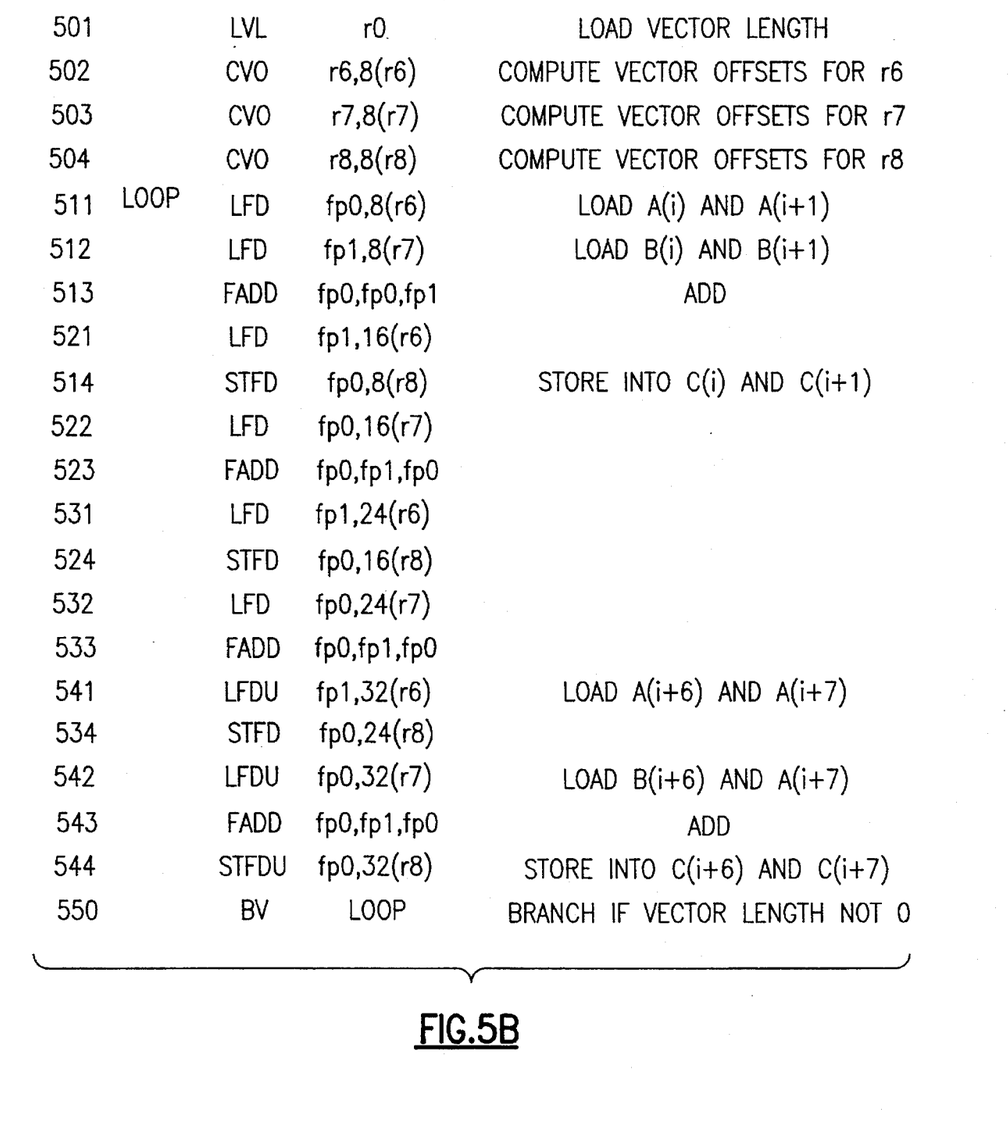
FIG. 5b shows modifications to the program segment in FIG. 5a for the present invention.

The program loops provided herein as examples, such as in FIGS. 5a and 5b of this specification, use instructions specified in prior IBM publication "PowerPC Architecture", First Edition, May 1993, available from the IBM corporation under customer reorder number SR28-5124-00.

Referring to FIGS. 5a and 5b, instruction sequences are shown for the example C=A+B, where A, B, and C are contiguous vectors. In each figure general purpose register r0 contains the vector length, and registers r6, r7, and r8 contain the base addresses for vector operands A, B, and C, respectively. In FIG. 5b, vector extension registers r6', r7' and r8' also contain the base addresses of vector operands A, B, and C, respectively. FIG. 5a shows POWER scalar instructions that perform the vector addition operation. The loop in FIG. 5a has been unrolled by four and the instructions have been reordered by an instruction scheduling compiler to optimize performance on a superscalar implementation of the POWER architecture.

FIG. 5b shows the modifications to the POWER instructions in FIG. 5a to accomplish the same vector addition operation on a two-pipeline vector central processing unit in half as many loop iterations as the single pipeline scalar version of FIG. 5a.

Referring to FIG. 5b, instructions are numbered in six groups for reference purposes. Instructions numbered 501 to 504 are loop setup instructions. Within the loop, instructions are numbered according to their sequence before unrolling and reordering by the compiler. Instructions numbered 511, 512, 513 and 514 refer to the first unrolled iteration. Instructions 541 to 544 refer to the fourth unrolled iteration. The instruction numbered 550 is the loop terminating branch instruction.

Instruction 501 moves the vector length into the architected vector length register from general purpose register r0, and sets the vector count register to the lesser of the section size and the vector length. Since each loop iteration processes four sections after unrolling, the actual vector length is four times the value in the vector length register. Instructions 502,503 and 504 decrement the base address values in r6, r7 and r8 by 8 bytes, representing the offset between consecutive elements in vector operands A, B and C, and leave the base address values in r6', r7' and r8' unchanged. On entry to the loop, registers r6, r7 and r8 contain base addresses for the first element in each vector operand, and registers r6', r7' and r8' contain base addresses the second element in the same operands.

Instruction 511 loads the first element of vector A into floating point register fp0 and the second element of A into the implied vector extension register fp0'. Instruction 512 loads the first two elements of vector operand B into registers fp1 and fp1'. Instruction 513 simultaneously adds the values in register fp1 and fp1' to those in registers fp0 and fp0', respectively, and saves the results in registers fp0 and fp0'.

Instruction 514 stores the values from registers fp0 and fp0' into the first two elements of vector operand C. Instructions 511, 512 and 514 specify a fixed offset of 8 bytes. In instruction 511, this value is multiplied by two, representing the pipeline bandwidth (section size) of the preferred embodiment, and added to the pipeline base addresses contained in general purpose register r6 and its extension r6' to obtain the address of the first and second elements of vector A, respectively. The same fixed offset of 8 bytes is applied in a similar manner to vectors B and C in instructions 512 and 514.

Instructions 521, 522, 523 and 524 add the third and fourth elements of vectors A and B and store the results into the third and fourth elements of result vector C using a fixed offset of 16.

Instructions 531 through 534 process the fifth and sixth elements of vectors A, B and C using a fixed offset of 24. Instructions 541 through 544 process the seventh and eighth vector elements using fixed offset 32.

Storage access instructions 541, 542, and 544 are of the update form.

In addition to accessing the seventh and eighth vector elements, these instructions offset the vector base addresses for the next iteration by 64 (the fixed offset of 32 times the pipeline bandwidth of B 2) to account for the eight elements processed by this iteration. Branch instruction 550 terminates the loop. This instruction decrements the vector length by the current vector count, and computes the vector count for the next iteration as the lesser of the section size and the remaining vector length. If the result is positive, the branch is taken, and the next set of vector elements is processed. A zero result terminates vector mode and causes execution to continue with the next sequential instruction following the branch instruction.

Figure 6:
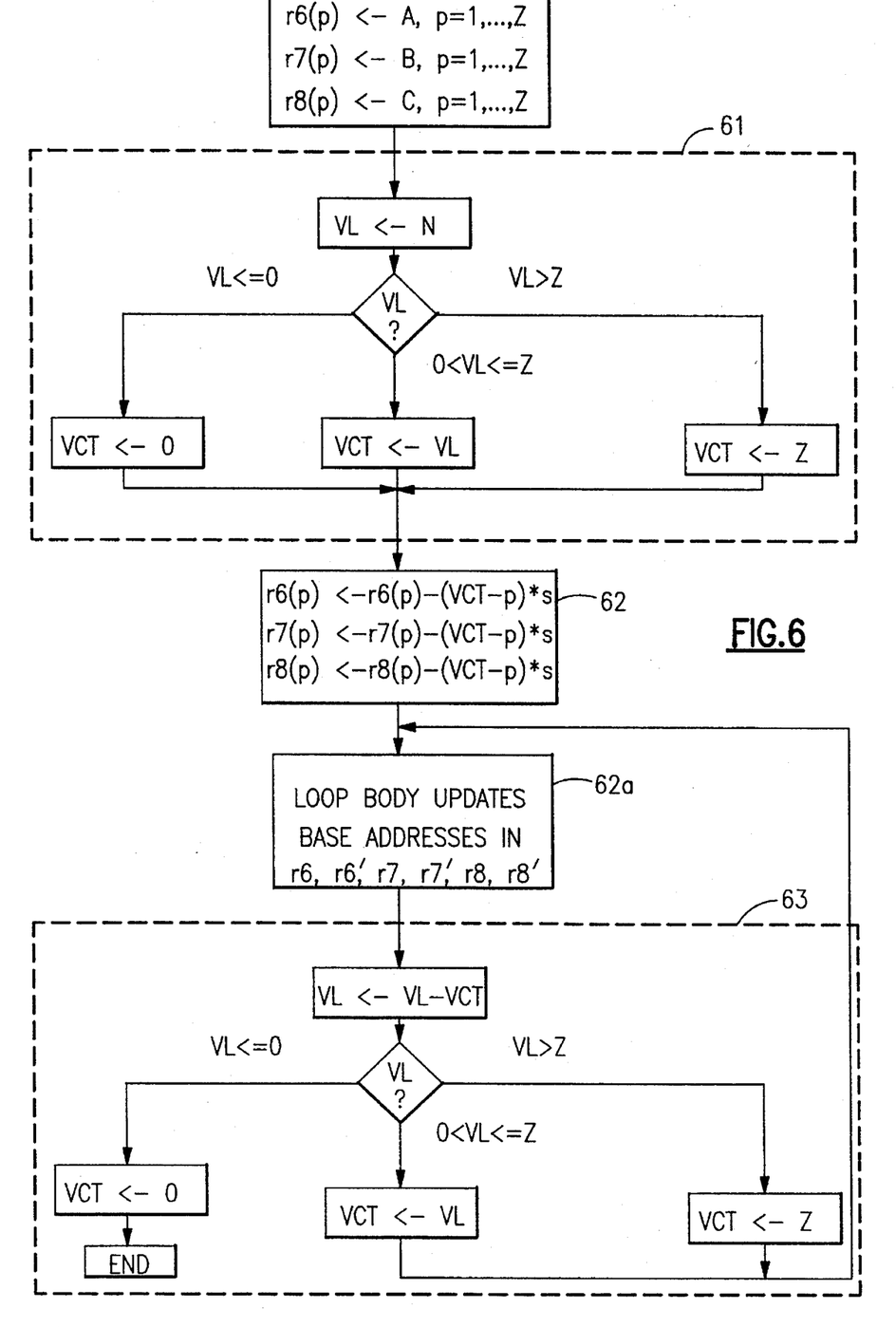
FIG. 6 is a flow chart representation of the vector sectioning operations for the program segment of FIG. 5b.

The generic structure of a vector processing loop employing the sectioning technique of the present invention is shown in the flowchart of FIG. 6. In the figure, N is the initial vector length, VL is the remaining vector length, VCT is the current vector count, z is the section size, and s is the stride. The base registers used for addressing vector operands are first initialized. Next, the LOAD VECTOR LENGTH REGISTER instruction copies the vector length into the vector length register and computes the vector count for the first iteration, as shown in the portion of the flowchart labelled 61.

In the block labeled 62, the COMPUTE VECTOR OFFSETS instruction is used to obtain base addresses for each pipeline. The COMPUTE VECTOR OFFSETS instruction modifies a base address that has been propagated to the elements of an effective vector register. The result is a vector of base addresses according to the formula $Ra(p)=Ra(p)-(VCT-p)*s$, where Ra is a an effective vector register whose elements contain the base address of a vector operand, p is the pipeline number (1 or 2 in the preferred embodiment), Ra(p) is the p-th element in the effective vector register Ra, VCT is the vector count, and s is the stride in bytes. The elements of the result vector are base addresses for the elements that will be processed by each pipeline. If the vector count or stride is zero, this instruction has no effect. This computation anticipates the first effective address calculation within the vector processing loop, where the base addresses will be offset by z units of stride.

In box 62a, vector operands are processed within the loop using the existing scalar instruction set, as extended to specify parallel vector element processing under control of the vector length register. Block 63 shows the operation of the BRANCH ON VECTOR instruction that updates the vector length and vector count registers, and passes control to the beginning of the loop or to the next sequential instruction depending on the new vector count value computed.

Figure 7:
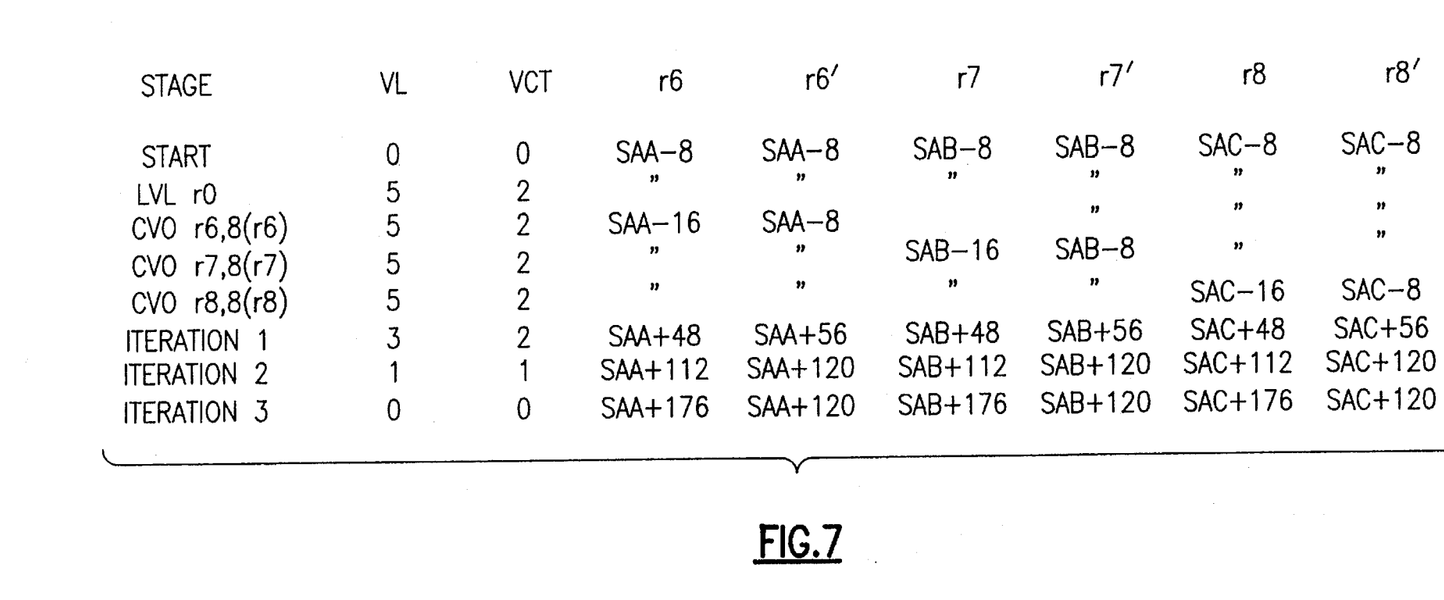
FIG. 7 is a tabular summary of the register contents resulting from the vector sectioning operations in the program segment of FIG. 5b.

The table in FIG. 7 illustrates the address computations that are performed for the loop in FIG. 5b, where vector operands A, B, and C each contain 20 contiguous 64 bit floating point elements. These 20 elements represent 10 two-element sections. Four sections (or eight elements) are processed by one iteration of the loop in FIG. 5b after unrolling. The 20 elements can be added in two full section iterations and one half-section iteration. The columns contain values of the vector length register, vector count register, and vector operand base address registers r6, r7, r8, and their vector extensions r6', r7' and r8'. In the table, the starting addresses (or first element addresses) for vector operands A, B, and C are shown as SAA, SAB, and SAC. Initial values are shown in the row labelled START.

The next four rows show values after execution of the instructions shown. The last three rows show values after completion of the specified loop iteration, that is, after execution of the BRANCH ON VECTOR instruction.

Initially, the vector length register and vector count register contain zero, indicating that the processor is in scalar mode. This is shown in the row labelled START. Registers r6, r7, and r8, representing the base registers for addressing operands A, B and C, contain the addresses of the first element in each of those operands less 8 bytes. The initial 8 byte negative offset anticipates that the first effective address calculation within the loop will increment the base address by the 8 byte displacement. Vector extension registers r6', r7' and r8' contain the same values as r6, r7 and r8 (scalar-mode instructions propagate their result to any vector extensions of the target register specified). After execution of the LOAD VECTOR LENGTH instruction, the vector length register is set to 5. Since the vector length is greater than the section size value of two, the vector count register is set to the section size. The COMPUTE VECTOR OFFSETS instruction updates the base registers to account for the additional processing bandwidth provided by the vector extension pipeline.

Consequently, r6 is decremented by 8 bytes and r6' is unchanged in the third row of the table. The same computation is performed for r7 and r8 in the next two rows. Within the loop, the base address registers are updated by the update instructions 541, 542 and 544. The displacement of 32 bytes is multiplied by the section size of two, which is then added to the current value in the base register to obtain the new value of the base register for each pipeline, as shown in the row labelled ITERATION 1. This operation is repeated in the next iteration to obtain the values shown in the next row.

In the last iteration, the vector count is one, indicating that the even pipeline is not used. Consequently, the values for vector extension registers r6', r7' and r8' are unchanged in the last row of the table.

The values of r6, r7 and r8 are incremented by 64 bytes, as in the first two iterations.

Under the vector processing technique disclosed herein, no additional requirements are imposed on the interruptability of instructions.

Vector operations take no longer than their scalar equivalents, so their is no need for vector mode instructions to be interruptible where their scalar equivalents are not. Where save/restore operations are necessary, the effective vector registers in the present vector processing technique impose little additional overhead beyond what is found in the base scalar architecture.

Having thus described my invention, what I claim as new and desire to secure by Letters Patent is:

1. A computing system having a central processing unit, comprising:

at least a first scalar execution unit and an extended scalar execution unit of a plurality of execution units of a same scalar type, the first scalar execution unit containing a first register file having a plurality of first scalar registers, and the extended scalar execution unit containing an extended register file having a plurality of extended scalar registers, an instruction unit for fetching and decoding instructions, instruction register selection controls in the instruction unit connected to the first scalar execution unit and to the extended execution unit for selecting a plurality of scalar registers having the same register file address in the first scalar execution unit and in the extended scalar execution unit to enable plural scalar registers in different register files of the same scalar type to be selected by a single address bus from the instruction unit, a vector length register connected to the instruction unit for indicating a number of scalar elements in vectors for processing by the CPU, the CPU operating in a scalar mode or a vector mode according to whether the vector length register contains a zero or non-zero value, instruction signalling lines connected between the instruction unit and both the first scalar execution unit and the extended scalar execution unit to simultaneously select registers in different register files having a same address in both execution units to enable simultaneously selected registers to simultaneously process different scalar elements in each vector being processed, and the CPU executing scalar instructions to operate as a vector processor when the vector length register contains a non-zero value, and to operate as a scalar processor when the vector length register contains a zero value.

2. A computing system having a central processing unit (CPU) as defined in claim 1, further comprising:

the first scalar execution unit and the extended scalar execution unit each being fixed point execution units and each having general purpose registers (GPRs) in a register file, and same addressed GPRs in each fixed point execution unit simultaneously receiving and processing a different fixed point scalar element in each vector being processed.

3. A computing system having a central processing unit (CPU) as defined in claim 1, further comprising:

the first scalar execution unit and the extended scalar execution unit each being floating point execution units and each having a register file of floating point registers (FLRs) and providing a same set of register addresses for the FLRs in each scalar execution unit, an FLR register selection signal being provided by the instruction unit to select an FLRs in each execution unit having a same FLR register address, the FLRs selected with the same register addresses receiving different floating point scalar elements in each vector being processed.

4. A method of operating a central processing unit (CPU), containing a plurality of execution units of a same type, each execution unit containing a register filer and each said register file having a same number of reqisters addressable with the same set of numbers, comprising the steps of:

signalling from an instruction unit to each execution unit of the same type a register address to select one register in each said register file in which each selected register has a same register number determined by the register address, a number of registers being selected equal to the number of execution units of the same type, setting a vector length value in a vector length register to a vector size to be processed by the CPU, testing the content of the vector length register, and setting a vector count field to the vector length value if it is equal or less than the number of execution units having the same register number selected by the instruction unit, but setting the vector count field to the number of execution units having the same register number selected by the instruction unit if the vector length value is greater than the number of execution units, initially loading corresponding registers in the first execution units with base addresses of respective vectors to be processed, performing a scalar program on the vectors to perform vector processing on the vectors.

5. A method of operating a central processing unit (CPU) as defined in claim 4, the performing step further comprising the steps of:

executing a loop of scalar instructions to perform vector processing on the vectors containing vector operands for each section of the vectors.

6. A method of operating a central processing unit (CPU) as defined in claim 5, the performing step further comprising the steps of:

decrementing the vector length register by the vector count field, branching to an entry point in the loop of scalar instructions to perform vector processing on each next section of the vector operands being used in the loop, and testing when the vector length count reaches a zero state to end the execution of the loop for the vector operands.

* * * * *

UNITED STATES PATENT AND TRADEMARK OFFICE
CERTIFICATE OF CORRECTION

PATENT NO. : 5,537,606
DATED : Jul. 16, 1996
INVENTOR(S) : Charles M. Byrne

It is certified that error appears in the above-identified patent and that said Letters Patent are hereby corrected as shown below:

Col. 15, line 25          "filer" should be -- file, --.

line 26          "reqisters" should be --registers--.

Signed and Sealed this

Nineteenth Day of November, 1996

*Attest:*

BRUCE LEHMAN

*Attesting Officer*          *Commissioner of Patents and Trademarks*